United States Patent [19]

Kodric

[11] 4,073,469
[45] Feb. 14, 1978

[54] SHUT-OFF VALVE FOR CONTROL OF FLOW OF MOLTEN PLASTIC MATERIAL

[75] Inventor: Joseph Kodric, Toronto, Canada

[73] Assignee: Inventive Plastic Products Ltd., Weston, Canada

[21] Appl. No.: 742,836

[22] Filed: Nov. 18, 1976

[51] Int. Cl.² .......................................... F16K 25/00
[52] U.S. Cl. .................................... 251/86; 137/341; 137/509; 239/533.9
[58] Field of Search ...................... 137/340, 341, 509; 239/132, 133, 533.9; 251/86

[56] References Cited

U.S. PATENT DOCUMENTS

| 1,883,866 | 10/1972 | Baur | 137/509 |
| 2,556,557 | 6/1951 | Schweitzer | 137/341 |
| 3,499,456 | 3/1970 | Rerecich | 137/509 X |

Primary Examiner—Harold W. Weakley
Attorney, Agent, or Firm—Sim & McBurney

[57] ABSTRACT

A shut-off cut-off nozzle for a plastic injection machine is constructed to ensure even heating and thereby avoid seizure of moving parts and to provide efficient and reliable mechanism.

12 Claims, 5 Drawing Figures

SHUT-OFF VALVE FOR CONTROL OF FLOW OF MOLTEN PLASTIC MATERIAL

FIELD OF INVENTION

This invention relates to a shut-off valve for a plastic mold feeder, particularly to a shut-off cut-off nozzle for a plastic injection machine.

BACKGROUND TO THE INVENTION

Molten plastic is fed to molds for the formation of plastic molded parts. Shut-off valves to control the flow of the plastic to the mold have been provided which are of generally cylindrical shape and have an axial plastic flow path therethrough. The downstream end of the valve has an orifice which is open for plastic flow when required and is closed by an axially reciprocal closure element. The interior arrangement of the parts in such prior art valves is deficient in that uneven heating of metal surrounding the reciprocal closure element occurs, leading to possible seizure of the unit and inefficient closure may occur due to misalignment of the closure element and the orifice.

SUMMARY OF INVENTION

The present invention provides a modified shut-off valve which avoids the difficulties of the prior art structure.

DESCRIPTION OF PREFERRED EMBODIMENT

Figure 1:
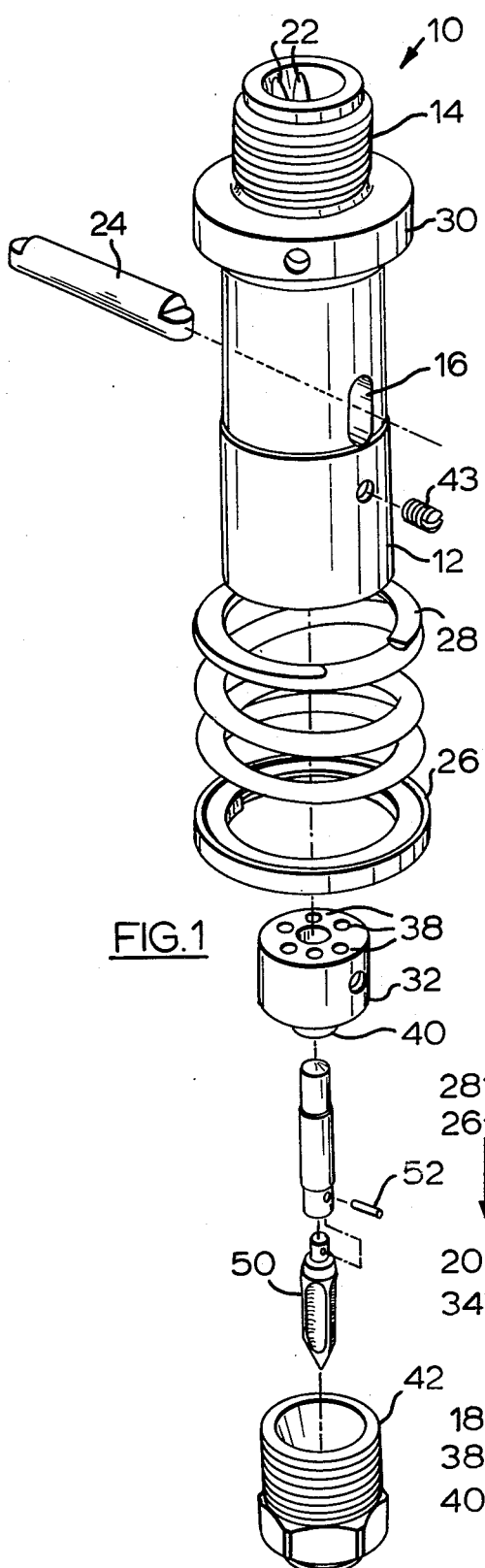
FIG. 1 is an exploded perspective view of a shut-off valve provided in accordance with one embodiment of the invention.

Referring to the drawings, a shut-off cut-off nozzle for a plastic injection machine 10 constructed of metal includes a cylindrical body 12 having an exterior screw thread 14 at its upstream end for connection to a feed of molten polymeric material.

A transverse slot 16 elongated axially of the body 12 is provided diametrically through the body 12 intersecting with the axis of the body 12. A cylindrical cavity 18 is provided in the downstream end of the body 12 coaxial with the body 12. An axial passageway 20 communicates between the cavity 18 and the slot 16.

Two pairs of molten polymeric material flow passages 22 are provided through the body 12 on opposite sides of the transverse slot 16 and communicating the upstream end of the body 12 with the cavity 18 to allow the flow of molten polymer to the cavity 18 through the body 12 past the slot 16.

A pin 24 extends through the slot 16 and projects from the ends thereof. The ends of the pin 24 are flattened and are received in recesses formed in the surface of a ring 26 surrounding the body 12 in slidable relation therewith. A spring 28 is positioned between the ring 26 and a further ring 30 which is fixedly connected to the outer surface of the body 12. The spring 28 normally biases the ring 26 and the transverse pin 24 a short distance from the extremity of the slot 16 nearest the ring 30.

A cylindrical insert member 32 is received in the cavity 18. The cylindrical insert has a central axial bore 34 which receives a pin 36 in close tolerance sliding-fit relationship, typically 0.2 to 0.3 thousandths of an inch. The pin 36 also extends through the passageway 20 into engagement with the surface of the transverse pin 24.

The cylindrical insert member 32 also is provided with a plurality of equally arcuately spaced satellite axial bores 38. In the illustrated embodiment, eight such bores 38 are provided.

An annular projection 40 is provided on the downstream face of the insert member 32. The insert member 34 is prevented from axial motion in the cavity 18 by a closure element 42 received in screw-threaded manner in the downstream end of the body 12, and is prevented from rotational motion by a radial pin 43 passing through the body 12 and received in a groove 45 in the insert member 32.

The closure element 42 has an axial orifice 44 for the discharge of molten polymeric material from the valve 10. The orifice 44 communicates with an axial bore 46 in the closure element 42 which in turn communicates with a generally frusto-conical cavity 48 of decreasing diameter in the downstream direction.

The downstream end of each of the satellite bores 38 communicates with the upstream end of the cavity 48 while the upstream end of the four of the bores 38 are held in alignment with and communicate with the pairs of passages 22 by the interaction of the pin 43 and the groove 45.

Figure 4:
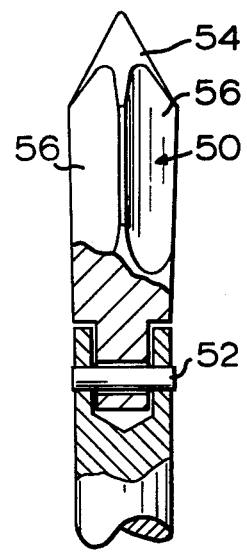
FIG. 4 is part sectional view of part of the valve of FIG. 1.
Figure 5:
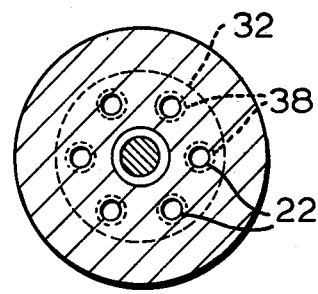
FIG. 5 is sectional view taken along line 5—5 of FIG. 3.

Connected in loose fit (see FIG. 4) relationship with the downstream end of the axial pin 36 is a flow-control needle 50, the interconnection being made using a transverse cotter pin 52. The axial dimension of the annular projection 40 is such that during movement of the axial pin 36 in opening and closing the valve 10, the cotter pin 52 is always located within the projection 40, so that the loose interconnection of the axial pin 36 and the flow control needle 50 may be retained and falling out of the pin 52 is avoided.

The flow control needle 50 extends in sliding fit relationship with the bore 46 and has a conical tip 54 at its downstream end which projects into the orifice 44 to close the same, the orifice 44 and the tip 54 defining a sharp cut-off surface. The side walls of the needle 52 are provided with elongate depressions 56 to allow the passage of molten material along the bore between the side walls of the needle 52 and the wall of the bore 46.

The loose fit connection of the needle 50 to the axial pin 36 ensures that the needle 50 can slide in the bore 46 and the pin 36 can slide in the axial bore 34 during opening and closing the valve without jamming of parts in the event that the bore 46 is not precisely aligned with the axis of the body 12. The bore 46 provides a guide for motion of the needle 50 to ensure proper alignment of the tip 54 and the orifice 44 and thereby reliable valve closure.

A heater band 58 surrounds the body 12 adjacent the downstream end thereof to maintain plastic material molten within the valve 10.

OPERATION

Figure 2:
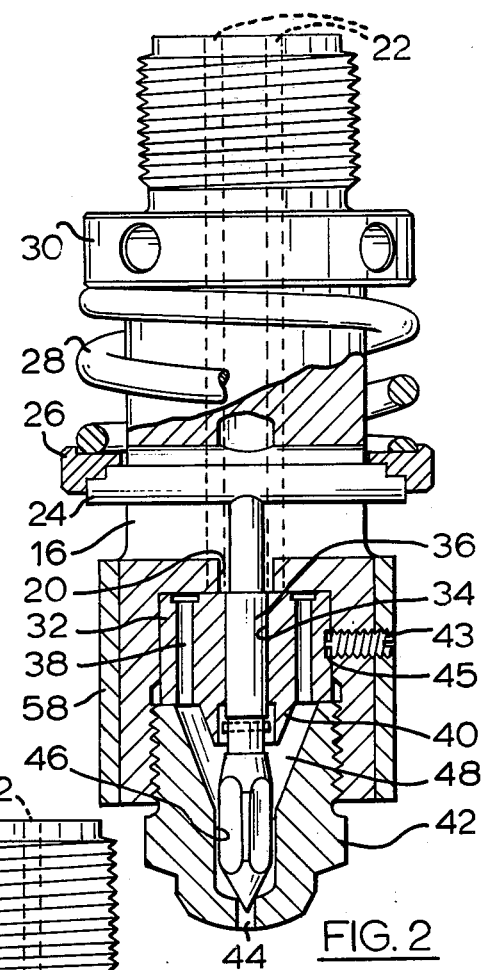
FIG. 2 is a sectional view of the valve of FIG. 1 taken along line 2—2 of FIG. 1 in the closed position.
Figure 3:
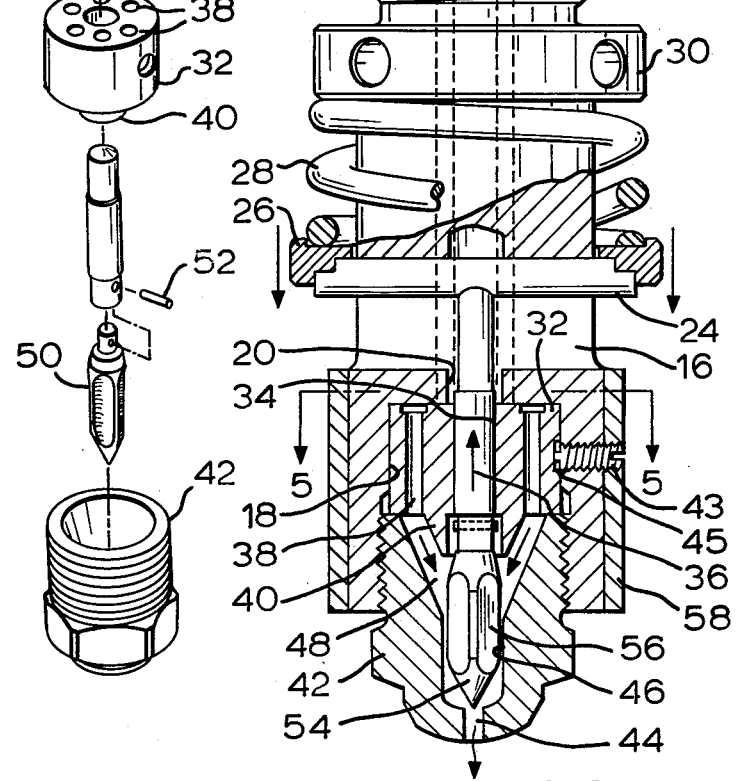
FIG. 3 is a sectional view of the valve of FIG. 1 taken along line 2—2 of FIG. 1 in the open position.

The closed position of the valve 10 is shown in FIG. 2, wherein it can be seen that the conical head 54 of the needle 50 projects into the orifice 44 closing the same. It will be assumed that the valve 10 has previously been used and is filled with molten polymeric material. The pressure exerted on the molten material by its feed mechanism exerts a pressure at the conical head 54 of the needle 50, for example, about 1,000 p.s.i., to cause axial motion of the pin 36 against the biasing action of the spring 28 until the transverse pin 24 engages the extremity of the slot 16, as shown in FIG. 3, allowing molten material to pass through the orifice 44 in the mold cavity.

When the pressure on the feed molten plastic material is ceased to be applied, the restorative biasing action of the spring 28 causes the conical head 54 to re-enter the orifice 44 to shut off the valve 10 and thereby prevent continued flow of polymeric material.

If desired, the opening and closing of the valve 10 may be assisted or effected by an air cylinder or the like.

The provision of the cylindrical insert 32 in the valve 10 with the equally arcuately spaced satellite bores 38 results in heat-induced expansion of the insert 32 equally in all radial directions. It is not possible to provide such even distribution of the plastic material flow all the way through the body 10 from the downstream end owing to the presence of the transverse slot 16.

Close tolerance fit of the axial pin 36 in the central bore 34 of the insert 32 prevents the ingress of molten polymer into the bore 34 with consequent avoidance of difficulties associated with a thin film of polymer in the bore 34, while the loose connection of the pin 36 and the needle 52 ensures free motion of the parts in their respective bores.

The provision of such a close tolerance is very difficult, if not impossible to attain by machining of a solid valve structure, enhancing further the advantage of using the insert 32.

If seizure of the motion of the needle 50 should occur, then the whole valve need not be discarded but rather the insert 32 and/or the axial pin 36 and/or the needle 50 only need to be replaced while the remainder of the valve 10 is retained.

SUMMARY

The present invention, therefore, provides a shut-off cut-off nozzle for plastic injection machines which is superior to the prior art structure in guarding against seizure and providing an efficient close off operation. Modifications may be made within the scope of the invention.

What I claim is:

1. A shut-off valve comprising:
   a cylindrical body,
   a cylindrical recess formed in one end of said body coaxial with said body,
   a diametrically-extending transverse slot formed in said body and elongated axially of said body,
   a pin located in and extending through said slot,
   means normally biasing said pin towards said one end of said body to space said pin from the end thereof remote from said one end,
   an axial passageway extending between said recess and said slot,
   an inlet at the other end of said body,
   passage means extending from said inlet to said recess out of fluid flow communication with said slot other than through said axial passageway for conveying liquid material from said other end to said recess,
   cylindrical insert means positioned in said recess,
   said insert means having an axial bore aligned with said axial passageway and a plurality of equally arcuately spaced bores radially located with respect to and parallel to said axial bore,
   means establishing fluid flow communication between the downstream end of said passage means and the upstream end of said plurality of bores,
   closure means in said one end of said body,
   said closure means having an orifice located on the axis of said body and passage means establishing fluid flow communication between said orifice and said downstream end of said plurality of bores, whereby fluid flow through said valve occurs successively through said inlet, said first-mentioned passage means, said plurality of axial bores, said last-mentioned passage means and said orifice, and
   orifice closure means located in said valve for reciprocal motion into and out of engagement with said orifice for opening and closing said valve,
   said orifice closure means including pin means extending in sliding fit through said axial bore in said insert, through said passageway and into engagement with said pin located in said slot,
   said orifice closure means normally being biased to close said valve by said biasing means through the biasing of said pin located in said slot.

2. The valve of claim 1, wherein said reciprocal pin means is received in close-tolerance sliding fit with said axial bore in said insert.

3. The valve of claim 1, wherein said first-mentioned passage means comprises two pairs of passages extending from said inlet to said recess with one pair on each side of said slot, and said plurality of bores comprise eight bores.

4. The valve of claim 3 including means aligning four of said plurality of bores with said two pairs of passages.

5. The valve of claim 4, wherein said alignment means comprises a pin extending radially through said body into interference engagement with a recess in the surface of said insert.

6. The valve of claim 1, wherein said last-mentioned passage means includes a bore formed in said closure means and extending upstream of said orifice in axial alignment with said axial bore in said insert means and a frustoconical chamber formed in said closure means and of cross-sectional dimension increasing in an upstream direction and establishing fluid flow communication between the downstream end of said plurality of bores and the upstream end of said bore formed in said closure means.

7. The valve of claim 6 wherein said orifice closure means includes a needle closure element connected to said pin means and mounted for sliding motion in said bore in said closure means, said needle closure means having a conical head for entry into said orifice and a contoured body for flow of liquid material through said bore in said insert means between said body and the walls of said bore.

8. The valve of claim 7, wherein the internal surface of said bore in said closure means at the downstream end thereof is contoured to provide a sharp cut-off surface.

9. The valve of claim 7, wherein said reciprocal pin means is received in close-tolerance sliding fit with said axial bore in said insert, said insert has a collar formed on the downstream face thereof surrounding said axial bore, and said reciprocal pin means and said needle closure means are connected in loose connection relationship in the area surrounded by said collar.

10. The valve of claim 8 wherein said loose connection is achieved by a recess formed in the downstream end of said reciprocal pin receiving a projection on the upstream end of said needle closure element in loose sliding fit relationship and a cotter pin received in aligned openings in said recess and said projection.

11. The valve of claim 10 wherein said contoured body has four lands engaging said bore in said closure element and four valleys of generally part-circular cross section between said lands.

12. The valve of claim 1 wherein said biasing means comprises a ring surrounding said cylindrical body in sliding relationship therewith and engaging the projecting ends of said pin located in said slot, a stationary ring mounted to the outer surface of said body adjacent said inlet and a coil spring surrounding said body and extending between said slidable ring and said stationary ring in biasing relationship therewith.

* * * * *